July 21, 1953     W. W. KUNTZ, JR     2,646,267
RETORT FOR HEATING THE EDGE OF SKELP IN THE
MANUFACTURE OF WELDED PIPE OR TUBING Filed June 25, 1948     3 Sheets-Sheet 1

INVENTOR
WELLINGTON W. KUNTZ JR.
BY
ATTORNEYS

INVENTOR
WELLINGTON W. KUNTZ JR.
BY
ATTORNEYS

July 21, 1953 W. W. KUNTZ, JR 2,646,267
RETORT FOR HEATING THE EDGE OF SKELP IN THE
MANUFACTURE OF WELDED PIPE OR TUBING
Filed June 25, 1948 3 Sheets-Sheet 3

INVENTOR
WELLINGTON W. KUNTZ JR.
BY
ATTORNEYS

Patented July 21, 1953

2,646,267

UNITED STATES PATENT OFFICE 2,646,267

RETORT FOR HEATING THE EDGE OF SKELP IN THE MANUFACTURE OF WELDED PIPE OR TUBING

Wellington W. Kuntz, Jr., Westfield, N. J., assignor to Air Reduction Company, Incorporated, a corporation of New York Application June 25, 1948, Serial No. 35,263

2 Claims. (Cl. 263—3)

This invention relates to retorts for heating the edges of skelp in the manufacture of welded pipe or tubing in which flat skelp is progressively bent to tubular form to bring the lateral edges together to form a longitudinal seam, and the metal at the edge faces is progressively heated to welding temperature, either while the skelp is flat or just prior to bringing the edge faces into contact, to cause the edge faces to weld together when they are pressed into contact with each other. The retort to which the invention particularly relates is of the kind that heats the edges of the skelp while the skelp is flat.

In order to properly heat the skelp edges, the skelp must be accurately guided past the edge-heating burners. So-called skelp guides do this, providing vertical and in some case horizontal restraint. There is an upper and lower guide for each edge of the skelp, and each guide usually has a fluted or grooved surface in engagement with which the skelp moves. Heretofore the skelp guides have each constituted part of a single casting which also included the brackets for mounting it, the burner mounting, and the fluted surface which actually guides the skelp. The casting was therefore rather complex and expensive. The severe temperature conditions to which these parts were subjected, together with the physical stress caused by the skelp being pulled through the retort, frequently caused cracks in the castings. This of course necessitated their replacement, which in addition to the cost of the defective part, resulted in a substantial amount of lost time—also costly. Furthermore, if a skelp guide of the type heretofore used survived the rigors to which it is normally subjected, the fluted surface on which the skelp actually rests would wear down and then the burner and skelp edge were no longer perfectly aligned, resulting in the necessity of replacing the entire casting.

The principal object of this invention is to provide a retort for heating skelp edges having an improved type of skelp guide that is durable and is easily and inexpensively replaced.

Another object is to provide a skelp guide that restrains the skelp vertically and that is adjustable vertically relative to the edge heating burner to compensate for wear.

The invention is illustrated in the accompanying drawings, in which.

Figure 1:
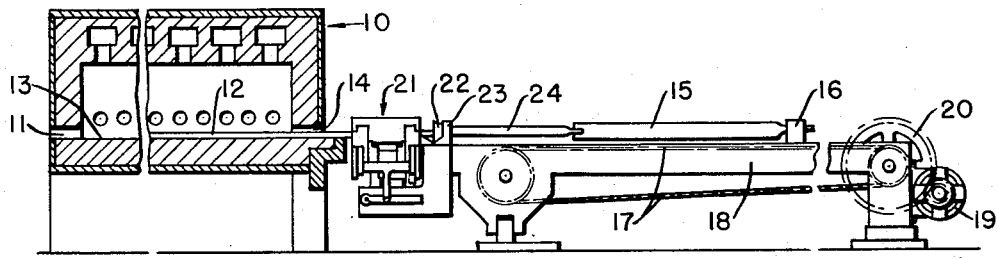
Figure 1 is a diagrammatic view, partly in vertical section, of a bell-weld tube-making unit.

To give a better understanding of the function of a retort of the kind to which this invention pertains and how it is related to the other associated parts of tube-making apparatus, one type of tube-making apparatus of which such a retort forms a part will first be described by reference to Fig. 1. This figure diagrammatically shows an edge-heating retort as part of tube-making apparatus which is adapted to make tubing by the drawbench bell-weld method, but it should be understood that the edge-heating retort of the present invention is not limited in its use to that particular kind of tube-making apparatus but may also be used in connection with apparatus which forms the skelp to tubular shape by means of forming rolls through which the skelp is passed.

In the drawbench bell-weld method of tube manufacture skelp strips are introduced into a furnace for preheating. Such a furnace is represented in Fig. 1 at 10. It has an entrance 11 at one end through which the skelps, designated 12, are introduced into the furnace to lie on the bottom 13 of the furnace until they become highly heated. Before the skelps are placed in the furnace they are usually prepared by tapering their forward ends and bending them upwardly. The skelps are withdrawn from the furnace one at a time through a discharge opening 14 by long tongs 15 which are first applied to the bent up end of the skelp to be withdrawn and then engaged with a dog 16 on an endless chain 17 mounted on a drawbench 18. The chain 17 is continuously driven by a motor 19 through gearing 20. As the skelps emerge from the furnace they are first drawn through a retort 21 to further heat the edges of the skelp. This retort corresponds to the retort which forms the subject of the present invention. The tongs then pull the skelp through a forming bell 22 which is supported against a head block 23 mounted on the drawbench just beyond the edge-heating retort 21. As the skelp passes through the bell it is formed to tubular shape and the lateral edges of the skelp which have been heated to welding temperature in the retort 21 are brought together and welded. The portion of a skelp that has been pulled through the bell and therefore formed to tubular shape and welded is represented at 24. In some instances the skelp is drawn successively through two dies instead of a single bell.

The edge-heating retort which forms the subject of the present invention is illustrated in Figs. 2–7 inclusive.

Figure 3:
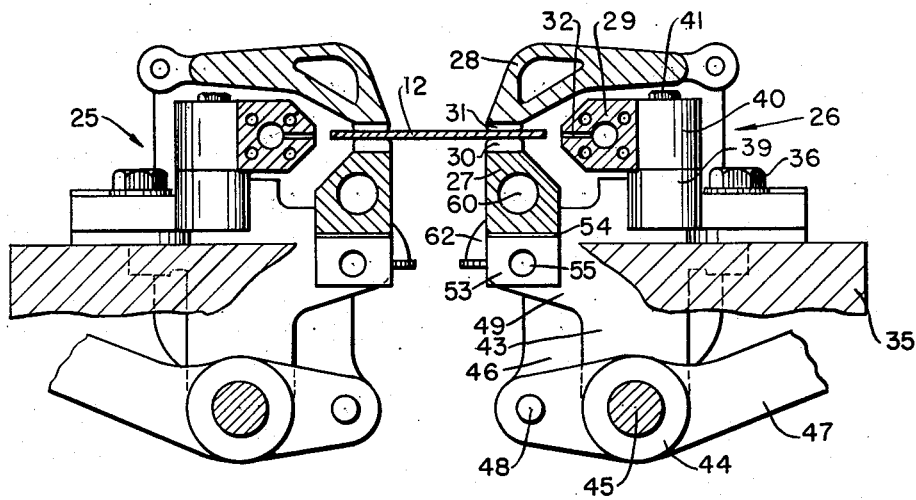
Fig. 3 is a transverse section of the retort taken along the line 3—3 of Fig. 2, but including the upper skelp guides.

As can be seen from Fig. 3, which shows the retort in transverse section, the two side portions 25 and 26 of the retort are identical in construction except for the reversal in position of certain corresponding parts at opposite sides of the longitudinal center line of the retort. The following description of one of the portions (the righthand portion 26) will therefore suffice for the other. It includes a lower skelp guide 27, an upper skelp guide 28, and a burner block 29. The lower skelp guide 27 has an upper surface which is grooved or fluted transversely to provide upstanding projections 30 (see also Figs. 4 and 5) which support and guide a lateral edge portion of the skelp 12 (Fig. 3) as it passes longitudinally through the retort. The upper skelp guide 28 has a lower surface which is similarly grooved or fluted transversely to provide projections 31 which lie over the projections 30 on the lower skelp guide and bear against the upper surface of the lateral edge portion of the skelp as it moves through the retort. As will be clear from Fig. 3, the upper and lower skelp guides support the corresponding lateral edge portion of the skelp as it passes longitudinally through the retort and guide it so that the edge face of the skelp is substantially in horizontal alignment with a row of jet passages 32 in the burner block 29 (see also Fig. 7). A combustible gas mixture, such as a mixture of acetylene and oxygen, is delivered to the burner block and issues from the jet passages 32. When ignited it produces a row of heating flames which are directed against the corresponding edge face of the skelp. The grooves in the upper surface of the lower skelp guide are preferably aligned vertically with those in the lower surface of the upper skelp guide, and each pair of vertically aligned grooves preferably comes opposite one of the jet passages 32 in the burner block. The products of combustion from the burner flames will then pass through the grooves in contact with the upper and lower surfaces of the skelp and heat the metal back from the edge face of the skelp. In some cases pure oxygen jets may issue from the jet passages in the burner block if the skelp has been sufficiently preheated by the time it reaches the retort to permit the oxygen to react with the skelp edges themselves to produce the required heat.

Figure 4:
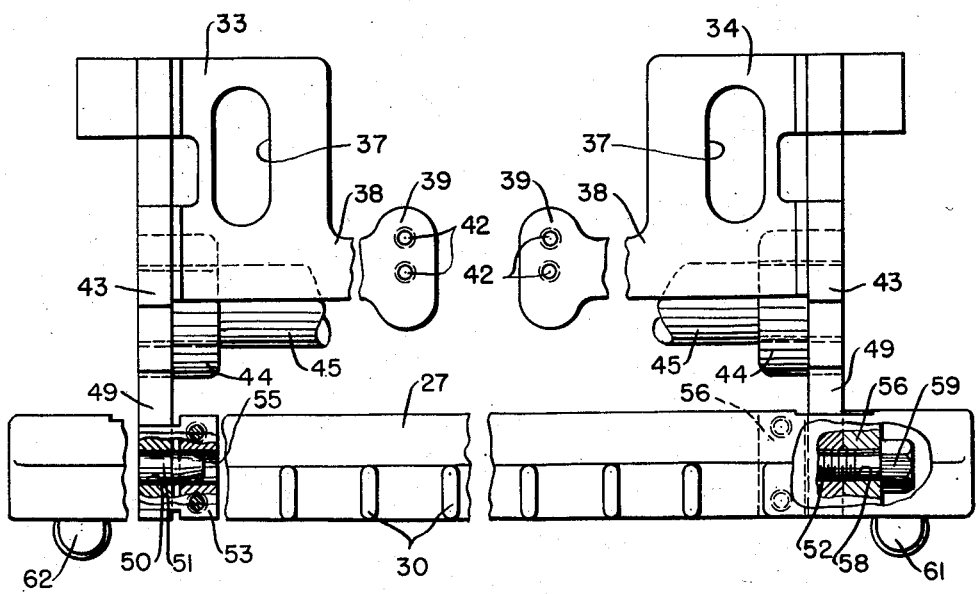
Fig. 4 is a broken plan view of one of the lower skelp guide assemblies, drawn to a larger scale, some parts being shown in horizontal section.
Figure 5:
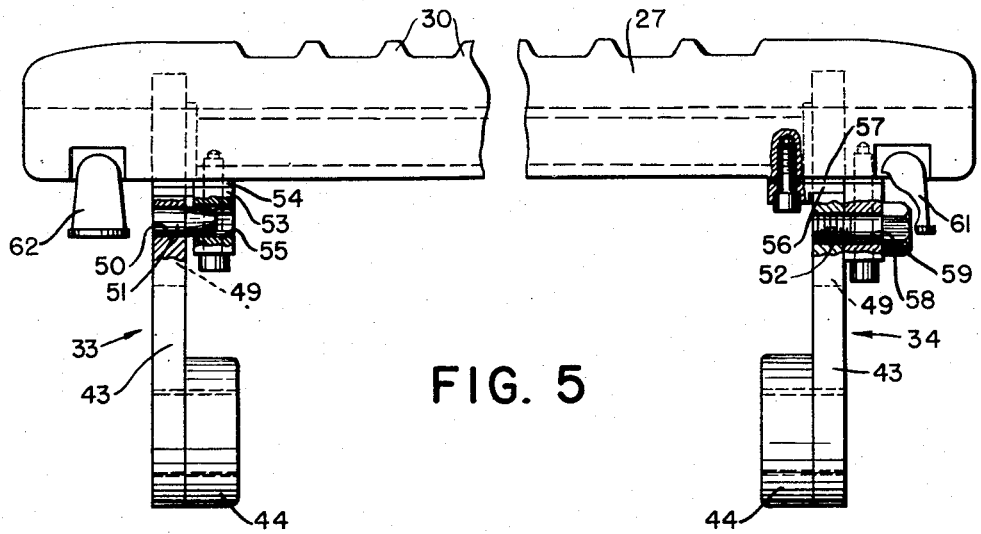
Fig. 5 is a broken side elevation of the lower skelp guide assembly of Fig. 4 as viewed from its inner side, some parts being shown in vertical section.
Figure 6:
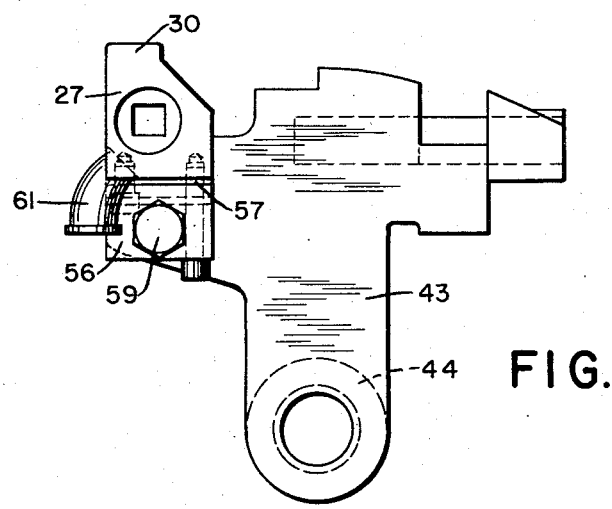
Fig. 6 is a right end view of the skelp guide assembly of Figs. 4 and 5.
Figure 7:
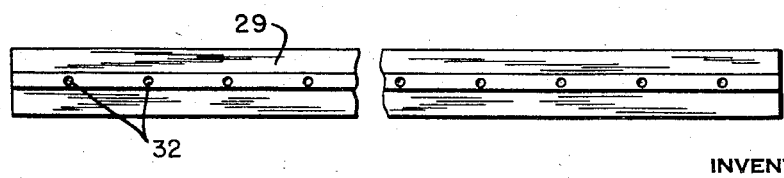
Fig. 7 is a front view of one of the edge heating burners of the retort.

The lower skelp guide 27 and burner block 29 are mounted on a skelp guide support which is shown in Figs. 4, 5 and 6 with the burner block omitted. As best shown in Fig. 4 it comprises two end members 33, 34, preferably metal castings, which are spaced apart longitudinally of the retort. Each of these end members is bolted to the retort casting 35 (Fig. 3) by means of a bolt 36 (Figs. 2 and 3) which passes through a slot 37 in the member. The slot 37 is elongated in a direction transversely of the retort. The retort casting 35 is in turn fastened to a base casting (not shown) which is bolted to an extension of the drawbench.

Figure 2:
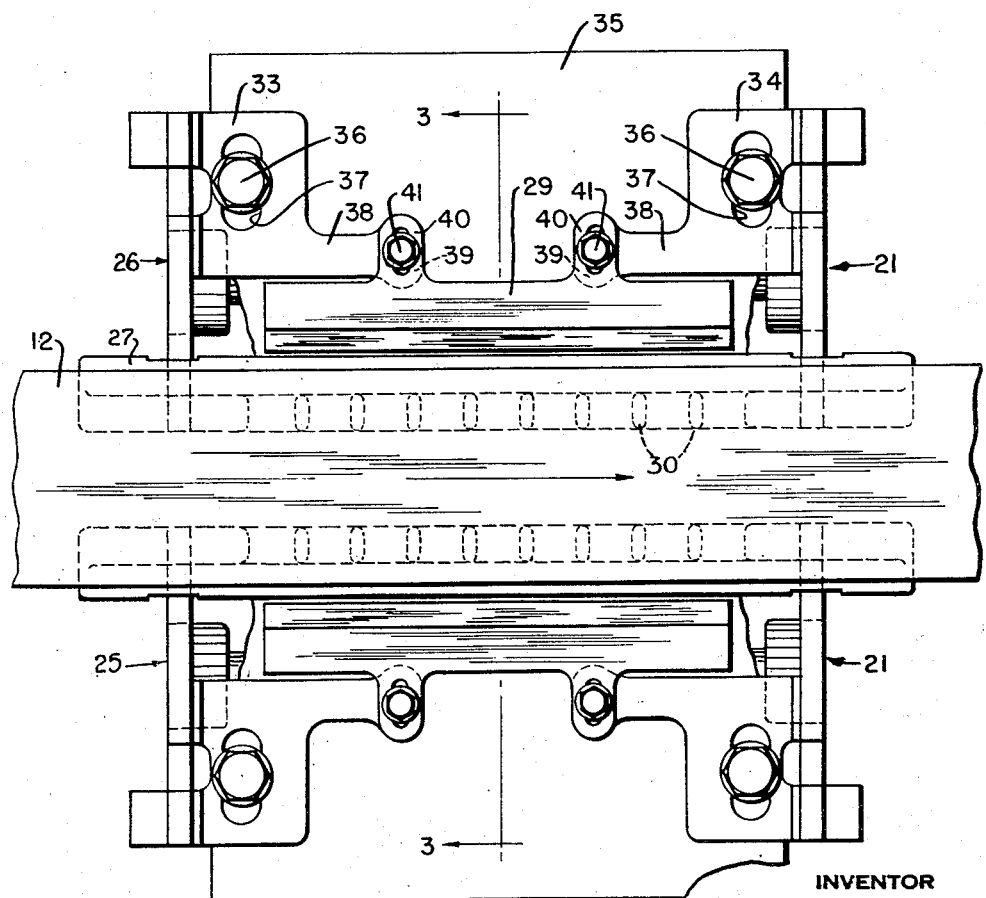
Fig. 2 is a plan view of a skelp edge-heating retort embodying the invention with the upper skelp guides and their supporting parts omitted.

Each of the castings 33 and 34 has an extension 38 (Figs. 2 and 4) which projects toward the other casting and terminates in a boss 39. The two bosses 39 are spanned by the burner block 29 as shown in Fig. 2, a pair of outwardly extending slotted ears 40 on the outer face of the burner block being bolted to the upper surfaces of the bosses by means of bolts 41. The bolts pass through the slots in the ears on the burner block and are screwed into one of several sets of threaded bolt holes 42 in the bosses 39 (Fig. 4). The bosses hold the burner block in such a way that there is a minimum amount of obstruction to the passage of air under the burner block.

Each of the castings 33 and 34 also has a downwardly extending portion or flange 43 at the lower end of which there is a hub 44 (Figs. 3 and 4). A shaft 45 is fixed in the hubs of the two castings. This shaft serves as a support for two end brackets of the upper skelp guide 28. Only one of these brackets appears in the drawings at 46 in Fig. 3. The brackets 46 can pivot upon the shaft 45. A lever 47 pivoted intermediate its ends on the shaft 45 is pivotally connected at its free end to one of the brackets 46 as shown at 48 (Fig. 3). When the lever 47 is depressed the upper skelp guide 28 is swung outwardly about the axis of the shaft 45 to permit access to the retort when this is necessary to remove jammed or broken skelp, to clean the retort, or for any other purpose.

The downwardly extending flange 43 on each of the castings 33 or 34 has a portion 49 which projects inwardly toward the center of the retort. This inwardly projecting portion on the forward casting, i. e. the casting nearest the entrance end or furnace end of the retort, is provided wth an opening 50 (Figs. 4 and 5) into which is tightly fitted a pin 51. The pin projects a short distance from the portion 49 of the casting longitudinally of the retort and toward the exit end of the retort, i. e. away from the furnace. As shown in Fig. 4 the protruding end of the pin is slightly tapered. The corresponding portion 49 of the rear casting, i. e. the casting nearest the exit end of the retort, has a threaded opening 52 preferably in longitudinal alignment with the opening in which the pin 51 is inserted. The pin 51 and the threaded opening 52 constitute part of the means by which the lower skelp guide 27 is detachably secured to the two skelp guide supporting end members or castings 33 and 34 which jointly constitute the principal part of the support for the lower skelp guide. An angle bracket 53 (Fig. 5) is bolted to the under side of the lower skelp guide 27 at its forward end. One or more shims 54 are inserted between the bracket and the lower surface of the skelp guide. A hole 55 is provided in the downwardly extending portion of the angle bracket and this hole is adapted to be slipped over the tapered protruding end of the above described pin 51 which is inserted in the forward skelp guide supporting casting. Another angle bracket 56 is bolted to the under side of the lower skelp guide 27 at its rear end, one or more shims 57 being inserted between the bracket and the skelp guide. A hole 58 is provided in the downwardly extending portion of this bracket corresponding to the hole 55 in the bracket 53. The two brackets 53 and 56 are so spaced apart and so proportioned that when the opening 55 in the bracket 53 is slipped over the projecting end of the pin 51 in the forward casting 33, the opening 58 in the bracket 56 can be made to lie adjacent to and in alignment with the threaded opening 52 in the rear casting 34. When these two holes are thus aligned a bolt 59 can be inserted through the hole in the bracket and its threaded end screwed into the hole in the casting, thereby attaching the skelp guide to the two castings. To assemble the lower skelp guide on the two castings 33 and 34 it is only necessary to approach the retort from its exit end, i. e. the end farthest from the furnace, slip the hole 55 in the bracket 53 over the projecting end of the pin 51, align the hole 58 in the bracket 56 with the corresponding hole 52 in the adjacent casting 34, and then insert the bolt 59. Similarly it can be easily and quickly detached from its support simply by removing the bolt 59 and moving the skelp guide longitudinally toward the exit end of the retort to withdraw the hole 55 in the bracket 53 from engagement with the projecting end of the pin 51.

Each of the lower skelp guides 27 is cooled by cooling water circulated through a central passage 60 in it (Fig. 3). A fitting 61 is provided at the rear end of the skelp guide (Fig. 5) through which the cooling water is admitted to the skelp guide, and another fitting 62 is provided at its forward end through which the cooling water is discharged. After the skelp guide is positioned on its supporting castings 33 and 34 the fitting 61 is connected to a suitable supply source for the cooling water. No connection is required for the water discharge fitting 62 as the water may pour from this fitting directly into a drain.

It will be seen from Figs. 4 and 5 that when the bracket 56 is screwed tight against the outer face of the rear casting 34 there is a space between the bracket 53 and the inner face of the forward casting 33. This allows the skelp guide freedom for longitudinal expansion and contraction since it is rigidly secured at one end only. This is an important feature since it eliminates practically all cracking and breaking of the skelp guide due to expansion and contraction. However, should the skelp guide crack or break, or should it need replacing because of wear, it is only necessary to remove the single bolt 59 and one water connection (at the relatively cool exit end of the retort remote from the furnace), then slip the defective skelp guide out and replace it. This procedure is both simple and quick, and the new guide to be substituted for the original one is inexpensive compared to the original one-piece castings heretofore used. The detachability of the skelp guide also renders it possible to make it out of a different metal from the other parts, if so desired, such as stainless steel or the like.

Upon original installation, and later as the skelp-contacting projections 30 on the lower skelp guide wear down from use, it is necessary to align the skelp with the jet passages 32 in the burner block for maximum efficiency. This is done by merely changing the shims 54 and 57 between the angle brackets and the skelp guide, it being unnecessary to move the burner block to effect this alignment. However, lateral adjustment of the burner block to vary the distance between its discharge face and the corresponding edge face of the skelp is permitted by the slots in the burner block ears 40 (Fig. 2) through which the bolts 41 pass to attach the burner block to the end castings 33 and 34, and by the several sets of bolt holes 42 in the castings which permit the bolts 41 to be screwed into the castings at different distances from the longitudinal center line of the retort. These adjustments in combination with the lateral adjustment of the end castings 33 and 34 permitted by the slots 37 in them through which the bolts 36 pass to attach these castings to the retort casting 35, permit a wide range of lateral adjustments of the burner blocks and the end castings at each side of the retort to accommodate skelps of various widths.

Only the lower skelp guides have been described as being detachably associated with their supporting structure. They are the most costly and complex and are subject to the most wear and abuse and it is therefore more important for them to be detachably associated with their supporting structure than the upper skelp guides. However, the invention is applicable to the upper skelp guides as well as the lower ones.

While the retort herein described, when related to the other parts of tube welding apparatus in the manner indicated in Fig. 1, is intended to heat the metal at the skelp edges to welding temperature so that the edges will weld together when they are pressed into contact, it may be used as a preheating retort to preliminarily heat the skelp edges which must then be raised to welding temperature in a subsequent heating step.

I claim:

1. In a retort for heating the edges of skelp as it moves longitudinally through the retort, a skelp guide support having portions spaced apart longitudinally of the retort, one of said portions having a pin projecting toward the other portion, a skelp guide for supporting an edge portion of the skelp spanning said portions of the skelp guide support and having at one end a part provided with an opening adapted to be slipped over the projecting end of said pin, means for detachably and fixedly connecting the other end of the skelp guide to the other portion of the skelp guide support, and a burner block supported on and connected to other portions of the skelp support and related to the skelp guide so that the flames or jets from the burner block are directed against the edge of the skelp as the skelp moves through the retort and is supported and guided by the skelp guide.

2. In a retort for heating the edges of skelp as it moves longitudinally through the retort, a skelp guide support having portions spaced apart longitudinally of the retort, one of said portions having a pin projecting toward the second portion and the second portion having a bolt hole, a skelp guide for supporting an edge portion of the skelp spanning said portions of the skelp guide support and having brackets at opposite ends, the bracket at one end of the skelp guide having an opening adapted to be slipped over the projecting end of said pin and the bracket at the second end of the skelp guide having a bolt hole adapted to be aligned with the bolt hole in said second portion of the skelp guide support when the first end of the skelp guide is positioned by slipping the opening in the bracket at that end of the guide over the pin, a bolt removably inserted in said aligned bolt holes to detachably and fixedly connect the second end of the skelp guide to said second portion of the skelp guide support, and a burner block supported on and connected to other portions of the skelp guide support and related to the skelp guide so that the flames or jets from the burner block are directed against the edge of the skelp as the skelp moves through the retort and is supported and guided by the skelp guide.

WELLINGTON W. KUNTZ, Jr.

References Cited in the file of this patent

UNITED STATES PATENTS

| Number | Name | Date |
| --- | --- | --- |
| 1,187,705 | Calvert | June 20, 1916 |
| 1,968,443 | Clark et al. | July 31, 1934 |
| 2,053,234 | Anderson | Sept. 1, 1936 |
| 2,091,340 | Sutherland | Aug. 31, 1937 |
| 2,178,451 | Jones et al. | Oct. 31, 1939 |
| 2,209,373 | Anderson | July 30, 1940 |
| 2,457,846 | Strickland | Jan. 4, 1949 |